Oct. 16, 1945.　　　　　H. SPINGLER　　　　　2,387,188
AUTOMOBILE TIRE SHIELD
Filed Aug. 7, 1944
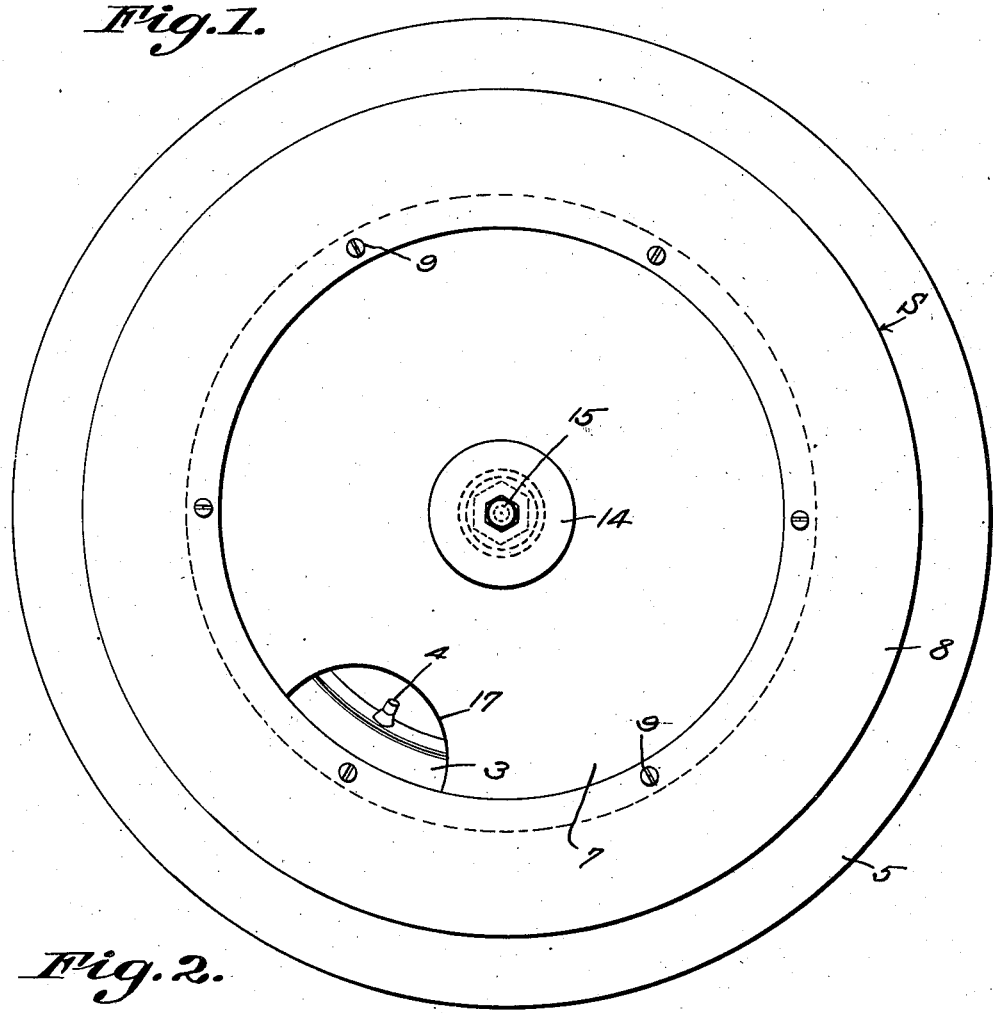
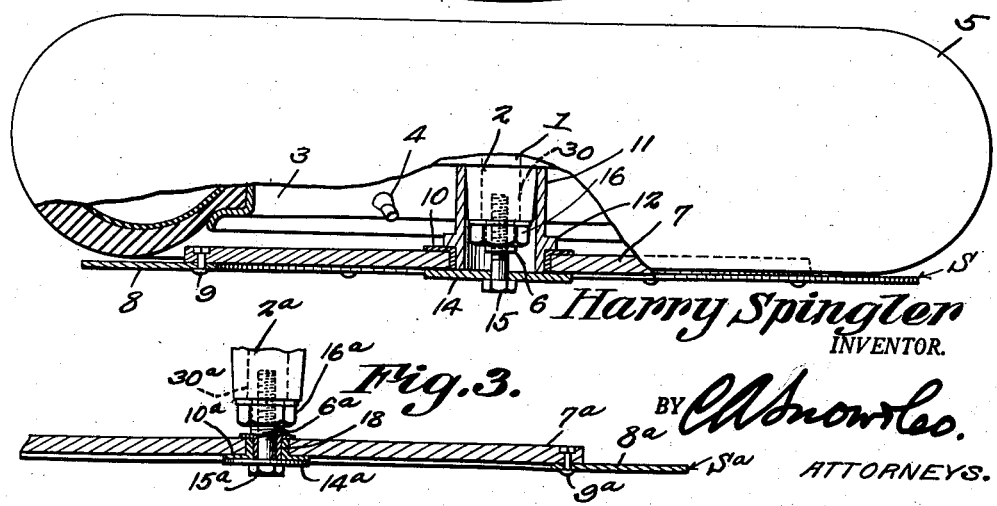
Harry Spingler
INVENTOR.
BY
ATTORNEYS.

Patented Oct. 16, 1945

2,387,188

UNITED STATES PATENT OFFICE 2,387,188

AUTOMOBILE TIRE SHIELD

Harry Spingler, Brooklyn, N. Y., assignor of twenty-five per cent to Richard Harry Spingler, Brooklyn, N. Y.

Application August 7, 1944, Serial No. 548,329

2 Claims. (Cl. 280—160)

The device forming the subject matter of this application is a tire shield, adapted to flex horizontally when the vehicle wheel approaches a curb, the shield engaging the tire on a vehicle wheel and preventing the tire from being damaged by contact with a curb.

At the present time, resilient metal is scarce, and the invention aims so to construct the shield that the central or body portion thereof will rupture under vehicle weight; for instance, in case of a blow-out, damage to the resilient, peripheral portion of the shield being avoided, and that expensive part of the shield being capable of repeated use.

A further object of the invention is to supply novel means for mounting the shield rotatably, with respect to the wheel and the tire.

A mechanic who abides by what is claimed may make changes in the structure shown and described without departing from the spirit of the invention.

In the drawing:

Figure 1 shows, in side elevation, a device constructed in accordance with the invention and mounted on an automobile wheel.

Figure 2 is a horizontal section wherein parts of the wheel and tire appear in plan.

Figure 3 is a fragmental, horizontal section, showing a modification.

Referring to the form shown in Figures 1 and 2, the numeral 1 designates a wheel, including a spindle 2 and a rim 3, the rim being supplied with an inflating valve 4, the rim carrying a tire 5.

The device forming the subject matter of this application is capable of use in connection with a wheel structure different from that described. A car axle is shown at 30 and includes a reduced end 6.

The shield, designated generally by the letter "S," includes a disk-like body 7, made of wood, resinous plastic or the like. An annulus 8 is provided, and is made of resilient material, such as steel. The annulus 8 overlaps the body 7 and is attached thereto by securing elements 9, such as bolts, a releasable connection between the annulus and the body thus being afforded.

In the center of the body 7 is secured a flanged wear ring 10. A sleeve 11 is slipped over the spindle 2 and abuts against the wheel 1. The outer end of the sleeve 11 receives the body portion 7 of the shield S for rotation. The sleeve has a circumferential shoulder 12, against which the wear ring 10 abuts.

A washer disk 14 is disposed against the outer surface of the body 7 of the shield S and is held in place by a head of a bolt 15, threaded into the axle 30. A nut 16 is threaded on the reduced part 6 of the axle 30 and engages the outer end of the axle.

As shown in Figure 1, the body 7 of the shield S is supplied with an opening 17, which affords access to the inflating valve 4.

When the vehicle wheel approaches a curb, the resilient annulus 8 will spring inwardly and engage the tire 5, the tire being prevented from being damaged by wiping along the curb. Since the shield can rotate with the vehicle wheel, there is no friction on the tire 5, produced by relative rotation between the shield and the tire.

The annulus 8 will yield laterally and engage the side wall of the tire, responsive to a horizontal thrust. The constituent material of the body 7 is weaker than the constituent material of the annulus 8, so far as resisting vertical compressive pressure is concerned. When the shielded tire is deflated accidentally, the vehicle weight will rupture the body 7 and the annulus 8 will not be distorted. Consequently, the annulus 8 may be used repeatedly, it being necessary, merely, to replace the inexpensive body 7, the securing elements 9 providing for such an interchange.

In the modified form shown in Figure 3, the sleeve 11 is dispensed with. In the figure specified, parts hereinbefore described have been designated by numerals already used with a suffix "a."

A flanged, tubular spacer 18 is provided and is mounted on the bolt 15a, between the washer 14a and the end of the part 6a of the axle 30a, the shield being maintained free for rotation.

What is claimed is:

1. A shield for the side wall of a vehicle tire, comprising a disk-like body, an annulus which becomes ground-engaging in the event of an unforeseen deflation of the tire wherewith the shield is used, the annulus being of greater diameter than the body, and means for securing the annulus to the body detachably; the annulus being made of resilient material, whereby the annulus will yield laterally and engage the side wall of a tire, responsive to a horizontal thrust, the constituent material of the body being weaker than the constituent material of the annulus, so far as resisting a vertical compressive pressure is concerned, whereby when a shielded tire is deflated accidentally, the vehicle weight will rupture the body before the annulus is distorted, and means for mounting the shield in place alongside a vehicle wheel.

2. A shield for a vehicle tire, constructed as set forth in claim 1, and wherein the last-specified means mounts the shield for rotation with respect to the wheel tire.

HARRY SPINGLER.